Patented June 7, 1927.

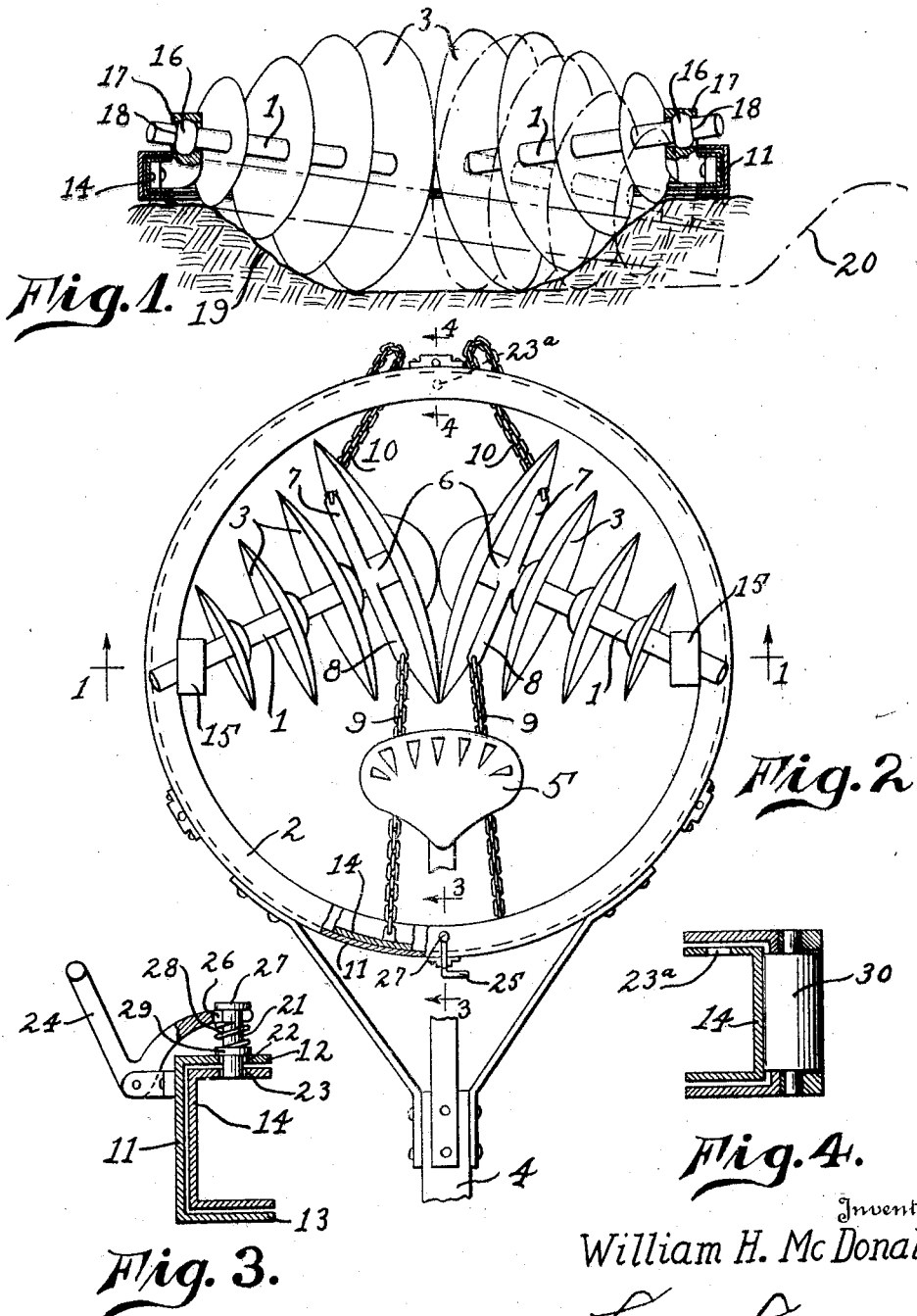

1,631,639

UNITED STATES PATENT OFFICE.

WILLIAM H. McDONALD, OF OVERTON, NEVADA.

DITCHING MACHINE.

Application filed June 21, 1926. Serial No. 117,304.

This invention relates to a machine for making irrigation ditches or trenches on farms or ranches. The general object of the invention is to provide an implement of simple construction which can be drawn along by horses or a tractor and which will operate to form a shallow trench or ditch behind them.

A further object of the invention is to provide a construction for the frame of the implement which will facilitate moving the horses to the other side of the cutters of the implement so as to facilitate the reversal of direction of movement of the implement. In this way, the implement can be pulled back and forth in the trench and it is constructed to adapt itself automatically to the change in direction of pull of the horses.

A further object of the invention is to provide simple means for locking the implement with the draft for the horses or the tractor disposed at either side.

Further objects of the invention will appear hereinafter.

The invention consists in the novel parts and combination of parts to be described hereinafter, all of which contribute to produce an efficient ditching machine.

A preferred embodiment of the invention is described in the following specification, while the broad scope of the invention is pointed out in the appended claims.

In the drawing:

Figure 1 is a vertical cross section taken about on the line 1—1 of Fig. 2.

Figure 2 is a plan with certain parts broken away and shown in section.

Figure 3 is a vertical section taken about on the line 3—3 of Fig. 2, but upon an enlarged scale.

Figure 4 is a cross section taken about on the line 4—4 of Fig. 2, upon an enlarged scale.

In practicing the invention, I provide two shafts 1 which are supported on the frame 2 of the implement in such a way that the shafts incline toward the rear and converge toward each other in this direction. These shafts are mounted so as to rotate freely and they are provided with a plurality of disc cutters 3. These cutters are of progressively larger diameters from the front toward the rear, that is to say, the rearmost cutters have the largest diameters. The implement may be drawn along by horses attached to a pole 4, the driver sitting upon the seat 5 (see Fig. 2). I provide means for connecting the forward part of the frame with the rear ends of the shafts 1 to limit their rearward movement. This means includes a swiveled collar 6 on each shaft near the rearmost cutter disc, and this swiveled collar has an arm 7 which extends rearwardly and an arm 8 which extends forwardly. To the arms 8, chains 9 are connected which extend forwardly with their forward ends connected to the frame. In a similar manner, chains 10 are provided at the rear which attach to the ends of the arms 7. These arms 7 extend out sufficiently so as to enable the chains to clear the edges of the large cutter discs which are disposed near these arms.

The frame 2 is preferably of substantially circular form and is most conveniently constructed of a channel bar (see Fig. 3) having a vertical web 11 and horizontal flanges 12 and 13.

Between the flanges 12 and 13, a ring 14 is mounted, and this ring is also of channel form. The ring 14 carries two bearings 15 which are disposed opposite to each other on the frame. These bearings are constructed as swivel bearings. For this purpose, each bearing is formed of a large ball 16 which is held in a rudimentary socket 17 (see Fig. 1), and the ball is provided with a bore 18 which operates as a bearing for the end of the shaft. In this way, the bearing provides for swiveling of the shaft and also permits a limited amount of movement of the shaft to and fro in the bearing.

In Fig. 1, the full lines indicate the manner in which the device operates in practice. When it is drawn along by the horses, the weight of the discs depresses the rear ends of the shafts so that the shafts 1 not only incline toward the rear, but they also incline downwardly. As the implement is drawn along, the cutters rotate and throw the dirt to one side and toward each side of the trench which is being formed.

If it is desired to form a trench of greater width than the approximate diameter of the frame, the implement should be drawn repeatedly down the trench with one set of discs riding on the inclined bank 19 of the trench (see Fig. 1), while the other set of cutters roll on the bottom of the trench, as indicated by the dotted lines in Fig. 1. When the implement is operating this way, the plane of the frame will of course be tilted from the horizontal position in which it is shown in full lines in Fig. 1 into the inclined position in which it is indicated in dotted lines in Fig. 1. In this view, the dotted line 20 indicates the bank of the trench which is opposite to the bank 19.

In order to facilitate the reversal of the direction of the excavating discs or cutters, when the implement arrives at one end of the trench, I provide means for enabling the circular frame 2 to be rotated on the ring 14. However, this frame 2 is normally locked to the ring 14 by means of a locking pin 21 (see Fig. 3). This locking pin moves up and down through a guide opening 22 in the flange 12, and its lower end may extend into an opening 23 in the upper flange of the ring 14. A bell crank lever 24 is provided for lifting this pin when it is desired to release it. This bell crank lever has a horizontally projecting bar 25 which the driver may rest his foot upon, and when he does so and shoves down, the forked end 26 of the bell crank lever will press upwardly against the head 27 of the pin and lift it. The pin is normally held down by a coil spring 28 which thrusts at its upper end against the under side of the forked end 26, and at its lower end against a collar 29 carried on the pin.

After the driver of the implement releases this pin, he holds it out until he has shifted the horses slightly to one side. He can then release the bell crank lever 24 and the lower end of the pin 21 will then rest on the upper face of the upper flange of the ring 14. The driver then wheels the horses around to the opposite side, and when the pin 21 has arrived at this point, it will drop into an opening 23ª similar to the opening 23, but diametrically opposite to it (see Fig. 2).

In order to facilitate the guiding and rotation of the circular frame on the ring 14, I may provide a plurality of bearing rollers 30 which are mounted to rotate on vertical axes (see Fig. 4). On their inner sides, the faces of these rollers engage the vertical web of the ring 14.

It is understood that the embodiment of the invention described herein is only one of the many embodiments this invention may take, and I do not wish to be limited in the practice of the invention, nor in the claims, to the particular embodiment set forth.

What I claim is:—

1. In a ditching machine, the combination of a frame adapted to be drawn over the ground, a pair of shafts supported on the frame and converging toward each other toward the rear of the frame, said shafts having a plurality of cutter discs of different diameters with the larger discs disposed toward the rear ends of the shafts, and means connecting the rear ends of the shafts with the frame for limiting their rearward movement.

2. In a ditching machine, the combination of a substantially circular frame, a pair of swivel bearings on opposite sides of said frame, a pair of shafts extending through said bearings and converging toward each other in a rearward direction, cutter discs mounted on said shafts, said cutter discs being of different diameters with the larger discs disposed toward the rear ends of the shafts, and means including chains connecting the rear ends of said shafts with said frame, and operating to limit the rearward movement of the shafts.

3. In a ditching machine, the combination of a substantially circular frame, a ring rotatably supported and guided on said circular frame, a pair of oppositely disposed swivel bearings supported on said ring, a pair of shafts disposed in an inclined direction with their forward ends carried in said bearings and with the rear portions of said shafts converging toward each other, said shafts having a plurality of cutter discs of different diameters with the larger discs disposed toward the rear, and means including chains connecting the shafts with the ring to limit the rearward movement of the shafts.

4. In a ditching machine, the combination of a substantially circular frame, a ring rotatably supported and guided on said circular frame, a pair of oppositely disposed swivel bearings supported on said ring, a pair of shafts disposed in an inclined direction with their forward ends carried in said bearings and with the rear portions of said shafts converging toward each other, said shafts having a plurality of cutter discs of different diameters with the larger discs disposed toward the rear, means including chains connecting the shafts with the ring to limit the rearward movement of the shafts, and means for locking the ring to the frame in different positions.

5. In a ditching machine, the combination of a substantially circular frame, a pair of swivel bearings supported on opposite sides of the frame, a pair of shafts rotatably mounted in said swivel bearings, a plurality of cutter discs mounted on said shafts, said cutter discs being of different diameters with the cutters of larger diameters toward the rear, means including chains connecting the rear ends of the shafts with the forward side of the frame and limiting the movement of the shafts rearwardly, and means including chains attached to the rear ends of said shafts extending in the opposite direction from the first-named chains and connected to the frame at the rear side, said chains cooperating to permit the shafts and cutters to swing toward the rear when the direction of pull upon the frame is reversed.

Signed at Los Angeles, California, this 14 day of June 1926.

WILLIAM H. McDONALD.